United States Patent
Brown

(10) Patent No.: US 7,608,143 B2
(45) Date of Patent: *Oct. 27, 2009

(54) METHODS OF REDUCING HYDROXYL IONS IN CONCRETE PORE SOLUTIONS

(76) Inventor: Paul W. Brown, 352 E. Irwin Ave., State College, PA (US) 16801

( * ) Notice: Subject to any disclaimer, the term of this patent is extended or adjusted under 35 U.S.C. 154(b) by 31 days.

This patent is subject to a terminal disclaimer.

(21) Appl. No.: 11/157,559

(22) Filed: Jun. 21, 2005

(65) Prior Publication Data

US 2006/0042516 A1    Mar. 2, 2006

Related U.S. Application Data

(63) Continuation-in-part of application No. 10/972,518, filed on Oct. 25, 2004.

(51) Int. Cl.
*C09D 5/00* (2006.01)
(52) U.S. Cl. ............... 106/724; 106/2; 106/14.05; 106/14.44; 427/207.1; 427/344
(58) Field of Classification Search ............... 106/819, 106/823, 724, 2, 14.05, 14.44, 824; 427/207.1, 427/344
See application file for complete search history.

(56) References Cited

U.S. PATENT DOCUMENTS

| | | | | |
|---|---|---|---|---|
| 3,536,655 | A * | 10/1970 | Burrill | 524/178 |
| 3,751,275 | A * | 8/1973 | Oken | 106/640 |
| 5,695,551 | A * | 12/1997 | Buckingham et al. | 106/2 |
| 6,323,268 | B1 * | 11/2001 | Fisher et al. | 524/266 |
| 6,403,163 | B1 * | 6/2002 | Fisher et al. | 427/387 |
| 6,432,191 | B2 * | 8/2002 | Schutt | |
| 6,685,766 | B2 * | 2/2004 | Standke et al. | 106/14.41 |
| 2006/0042518 | A1 | 3/2006 | Brown et al. | |
| 2006/0254469 | A1 * | 11/2006 | Hirata et al. | 106/805 |

FOREIGN PATENT DOCUMENTS

JP    2002326854 A  * 11/2002
WO    WO 2006/026562    3/2006

OTHER PUBLICATIONS

JP 2002326854 A (Asahi Denka) Published Nov. 12, 2002. Japanese Derwent Abstract only.*
Answer 9 of 18 Chemical Abstracts on STN EP 1628933 (Hirata et al.) Mar. 1, 2006. abstract only.*
Answer 12 of 18 of Chemical Abstracts on STN JP 01160886 (Ichikawa et al.) Jun. 23, 1989. abstract only.*
Answer 6 of 18 Chemical Abstracts on STN "Reduction of Portland Cement Paste Porosity by TEOS Impregnation", Rossetto et al., Int'l Congresss on Chemistry of Cement, 11th, Durban, S. Africa, May 11-16, 2003 (meeting date 2003), 1449-1459.*
Brinker & Scherer, Sol-Gel Science, The Physics and Chemistry of Sol-Gel Processing, 1989 Fig. 5, P. 104, Table 3, p. 113, Figs. 10a & 10b, p. 120.
Prepared by the Minerals and Metals Sector, Natural Resources, "Lithium," Canadian Minerals Yearbook, Canada, 2004, retrieved from http://www.nrcan.gc.ca/mms/cmy/content/2004/35.pdf on Jul. 23, 2008.

* cited by examiner

*Primary Examiner*—Paul Marcantoni
(74) *Attorney, Agent, or Firm*—Eckert Seamans Cherin & Mellott, LLC; Carol A. Marmo, Esq.

(57) ABSTRACT

Methods of reducing hydroxyl ions in concrete pore solutions are provided. Such methods are useful in providing resistance to gels which form in concrete due to the alkali-silica (ASR) reaction. The methods comprise, in one aspect, adding a salt, in aqueous or solid form, to the concrete, the salt having a cation higher in valence than the anion. In other aspects, the methods of the present invention comprise adding an acidic phosphate or a silicon-containing alkoxide to the concrete. All of the above methods are useful in reducing hydroxyl ions in concrete. Such methods can be used to resist ASR in fresh concrete, in concrete that is setting, or in hardened concrete. Methods are also provided for mitigating ASR while simultaneously healing cracks in concrete or bonding new concrete to existing concrete. The methods involve reacting an Si-containing alkoxide with a source of reactive calcium to produce calcium silicate hydrate.

12 Claims, No Drawings

METHODS OF REDUCING HYDROXYL IONS IN CONCRETE PORE SOLUTIONS

CROSS-REFERENCE TO RELATED APPLICATIONS

This application is a continuation-in-part of U.S. patent application Ser. No. 10/972,518, filed Oct. 25, 2004, which is a continuation-in-part of U.S. patent application Ser. No. 10/927,733, filed Aug. 27, 2004, the contents of which are incorporated herein by reference.

FIELD OF THE INVENTION

The present invention relates to methods of reducing hydroxyl ions in concrete pore solutions by the addition of inorganic or organic acids or salts such as $Ca(NO_2)_2$, $Ca(NO_3)_2$ or calcium acetate.

BACKGROUND INFORMATION

Concrete is a conglomerate of aggregate (such as gravel, sand, and/or crushed stone), water, and hydraulic cement (such as portland cement), as well as other components and/or additives. Concrete is initially fluid-like when it is first made, enabling it to be poured or placed into shapes. After hardening this property is lost. When concrete is mixed, it takes about twenty-eight percent of the weight of cement as water to fully consume all the cement in making hydration products. However, it is not possible to attain a fluid mix with such a small amount of water, and more water than is needed is added. The additional water simply resides in the pores present in concrete, and is referred to as the pore liquid or pore solution.

When Portland cement is mixed with water to produce concrete, the alkali oxides present in the cement, $Na_2O$ and $K_2O$, dissolve. Alkali materials are supplied by the cement, aggregate, additives, and even from the environment in which the hardened concrete exists (such as salts placed on concrete to melt ice). Thus, the pore solution produced becomes highly basic. It is not unusual for this pore solution to attain a pH or 13.3 or higher. Depending on the aggregate used in the concrete, a highly basic pore solution may interact chemically with the aggregate. In particular, some sources of silica in aggregate react with the pore solution. This process is called the alkali-silica reaction (ASR) and may result in formation of a gelatinous substance which may swell and cause damage to the concrete. The swelling can exert pressures greater than the tensile strength of the concrete and cause the concrete to swell and crack. The ASR reaction takes place over a period of months or years.

Although the reaction is referred to as the alkali-silica reaction, it will be appreciated that it is the hydroxyl ions that are essential for this reaction to occur. For example, ASR will not occur if silica-containing aggregates are placed in contact with alkali nitrate solutions with Na or K concentrations comparable to those which result in ASR if those solutions were alkali hydroxides.

In extreme cases. ASR can cause the failure of concrete structures. More commonly. ASR weakens the ability of concrete to withstand other forms of attack. For example, concrete that is cracked due to this process can permit a greater degree of saturation and is therefore much more susceptible to damage as a result of "freeze-thaw" cycles. Similarly, cracks in the surfaces of steel reinforced concrete can compromise the ability of the concrete to keep out salts when subjected to deicers, thus allowing corrosion of the steel it was designed to protect.

There are a number of strategies which have been used to mitigate or eliminate ASR. One strategy is to reduce the alkali content of the cement. It is common in cement technology to sum the amounts of $K_2O$ and $Na_2O$ present and express these as an $Na_2O$ equivalent. Cements containing less than 0.6 wt % $Na_2O$ equivalent are called low alkali. However, merely using a low alkali cement does not ensure that the alkali silica reaction can be avoided. Another common strategy is the intentional addition of a source of reactive silica, which acts as an acid to neutralize the alkali. Such sources are fine powders and are typically silica fume (a high surface area $SiO_2$ formed as a by-product of making ferro-silicon), fly ash (high surface area materials produced in the combustion of coal which contains $SiO_2$), and natural pozzolans (high surface area materials produced which contains $SiO_2$ and which are typically produced by volcanic action).

Another technology involves the addition of a soluble source of lithium such as $LiOH$ or $LiNO_3$. The mechanism of action of Li is not entirely resolved, but it appears to stabilize the alkali silica gels which form. These Li-containing gels then appear to provide a low permeability layer over the underlying reactive material.

There are economic and other disadvantages with most of the above methods. For example, lithium compounds are very expensive and have therefore not gained much acceptance. The use of mineral admixtures such as silica fume or fly ash requires additional storage silos, and requires additional mixing. Further, silica fume is expensive, and if not properly blended into the concrete can actually cause ASR. Finally, combustion technology is changing to reduce $NO_x$ emissions, which in turn makes fly ash less reactive and thus less suitable as an additive to reduce ASR. Fly ash and silica fume are not suitable for treatment of existing structures. There remains a need for economic and effective methods of reducing ASR in concrete.

SUMMARY OF THE INVENTION

The present invention solves the above needs, by providing methods of reducing hydroxyl ions in concrete. In one aspect, the present invention provides a method of reducing hydroxyl ions in concrete pore solutions containing alkali metal cations and hydroxyl ions, comprising adding a salt to the concrete. The salt comprises a cation, denoted herein as Cat, and an anion, denoted herein as An, the cation having a higher valence than the anion. Additionally, the Cat-An salt should have a solubility in water that is greater than Cat-OH, such that when the Cat-An salt dissociates and the Cat precipitates as Cat-OH, the resulting alkali metal-An salt formed remains in solution or has a solubility in the concrete pore solution greater than that of said Cat-An salt.

In another aspect, the present invention provides a method of reducing hydroxyl ions in concrete pore solutions containing alkali metal cations and hydroxyl ions, comprising adding a salt to said concrete, wherein said salt comprises a cation and an anion, said cation having a higher valence than said anion. In this embodiment, the Cat-An salt will have a solubility in concrete pore solutions having pH values higher than that of a saturated $Ca(OH)_2$ solution in water that is greater than Cat-OH, such that when said Cat-An salt precipitates as Cat-OH the resulting alkali metal-An salt formed remains in solution or has a solubility in water greater than that of said Cat-An salt. This embodiment embraces those anions such as oxalate which are less soluble than Cat-OH in water, but which become more soluble than Cat-OH when the pH of the solution reaches about 13.

In an additional aspect, the present invention provides a method of reducing hydroxyl ions in concrete pore solutions, comprising adding an acidic phosphate to the concrete.

In yet a further aspect, the present invention provides a method of reducing hydroxyl ions in concrete pore solutions, comprising adding a silicon-containing alkoxide to the concrete. The silicon-containing alkoxide has the formula $(RO)_x SiR'_{(4-x)}$, where x can be 1 to 4, R is an alkyl, alkenyl or alkynl group of one or more carbons, straight or branched, and each R can be the same or different from each other R or R'.

In all of the above methods, hydroxyl ions are substantially reduced in the pore solution. While the alkali-silica reaction has been recognized for decades, it was generally not thought to be a problem of excess hydroxyl ions in the pore solution, and remediation efforts did not focus on this aspect. Additionally, the addition of acids to concrete was thought to have a detrimental effect on the desired properties of the concrete. See, e.g., Lea, *The Chemistry of Cement and Concrete*, pp. 659-676 (Ch 20), which describes the actions of various compounds on concrete, including ammonium acetate, aluminate nitrate, lactic acid, acetic acid, tartaric acid, citric acid and malic acid. All of these are stated to cause attack on the concrete. Oxalic acid exhibits only a minor effect due to the low solubility of Ca oxalate.

It is an object of the present invention, therefore, to provide methods of reducing hydroxyl ions in concrete.

It is an additional object of the present invention to provide a method of reducing hydroxyl ions in concrete by the addition of a salt, an acidic phosphate, or a silicon-containing alkoxide.

It is a further object of the present invention to provide a method for healing cracks and fissures in hardened concrete while at the same time mitigating ASR by reducing hydroxyl ions.

It is another object of the present invention to provide a method for bonding new concrete to existing concrete while at the same time healing cracks that form in the new and existing concrete and mitigating ASR by reducing hydroxyl ions.

It is a further object of the present invention to provide a solution of an Si-containing alkoxide that is capable of infiltrating cracks and fissures in concrete and reacting with a source of calcium to form calcium silicate hydrate that reduces the volume of the cracks and fissures.

It is another object of the present invention to provide calcium silicate hydrate that reduces the volume of cracks and fissures in concrete, thereby "healing" the concrete.

It is a further object of the present invention to provide a concrete bonding agent that is based on an Si-containing alkoxide such as tetraethyloxysilane (TEOS) and partially hydrolyzed TEOS.

It is another object of the present invention to provide a concrete bonding agent that continues to act after new concrete has converted to a hardened mass after having been placed in contact with existing concrete.

It is a further object of the present invention to provide a concrete bonding agent that continues to act after new concrete that was cast over existing concrete has undergone substantial chemical shrinkage.

These and other aspects of the present invention will become more readily apparent from the following detailed description and appended claims.

DETAILED DESCRIPTION OF PREFERRED EMBODIMENTS

In one aspect, the present invention provides a method of reducing hydroxyl ions in concrete pore solutions containing alkali metal cations and hydroxyl ions, comprising adding a salt to said concrete. The salt comprises a cation, denoted herein as Cat, and an anion, denoted herein as An, the cation having a higher valence than the anion. Additionally, the Cat-An salt should have a solubility in water that is greater than Cat-OH, such that when the Cat-An salt dissociates, the Cat-OH precipitates, and the resulting alkali metal-An salt formed remains in solution or has a solubility in the concrete pore solution greater than that of said Cat-An salt.

In another embodiment, the present invention provides a method of reducing hydroxyl ions in concrete pore solutions containing alkali metal cations and hydroxyl ions, comprising adding a salt to said concrete, wherein said salt comprises a cation, denoted herein as Cat, and an anion, denoted herein as An, said cation having a higher valence than said anion. In this embodiment, the Cat-An salt will have a solubility in concrete pore solutions having pH values higher than that of a saturated $Cat(OH)_2$ solution in water that is greater than Cat-OH, such that when said Cat-An salt precipitates as Cat-OH the resulting alkali metal-An salt formed remains in solution or has a solubility in water greater than that of said Cat-An salt. This embodiment embraces those anions, such as oxalate described below, which are less soluble than Cat-OH in water, but which become more soluble than Cat-OH when the pH of the solution reaches about 13.

Any salt containing a suitable cation can be used, so long as the cation has a valence higher than that of the anion and the salt meets the above listed criteria. Suitable cations include, but are not limited to, Ca, Fe, Mg, Mn, Al, Cu, Zn, Sr, Ti and combinations of these. Preferred cations are Ca, Mg, Fe and Al. The most preferred cation is Ca.

Similarly, any salt with a suitable anion can be used, provided that the valence and solubility criteria described above are met. Additionally, the anion must be innocuous in concrete, and should not affect the desirable qualities of concrete such as hardening and durability, and should not subject the reinforcing steel elements in concrete to attack. Thus, certain anions such as chlorides, sulfates and carbonates would not be suitable for use in concrete. Suitable anions can be either organic and inorganic anions, including, but not limited to, nitrate, nitrite, acetate, benzoate, butyrate, citrate, formate, fumarate, gluconate, glycerophosphate, isobutyrate, lactate, maleate, methylbutyrate, oxalate, propionate, quinate, salicylate, valerate, chromate, tungstate, ferrocyanide, permanganate, monocalcium phosphate monohydrate ($Ca(HPO_4)_2 \cdot H_2O$), hypophosphate, and combinations thereof. Preferred anions include nitrate, nitrite, acetate and oxalate. This list is not meant to be exhaustive, and organic anions that are polymers, such as ionomers and polyelectrolytes, and/or oligomers can be used, provided that they meet the criteria described above. Examples of suitable salts are found in Tables 1, 2 and 3.

As will be appreciated by one skilled in the art, the salt can be added to fresh concrete, in solid or aqueous form, or can be introduced into hardened concrete as an aqueous solution. The salt can also be used to remediate existing concrete by means of an overlay, and can be added to the fresh overlay or the hardened overlay as desired. As used herein, the term "added", as in "added to concrete", means the addition of the hydroxyl-removing material to fresh concrete in solid or aqueous form, as well as the introduction of the material into hardened concrete, typically in aqueous form. Methods of mixing the components used to make concrete are standard and well known in the art As described more fully below in the examples, the amount of salt added will be that amount sufficient to bring the effective $Na_2O$ equivalent to an amount which is less than the effective $Na_2O$ equivalent in the cement used in the concrete, more preferably to an amount which is sufficient to bring the effective Na$_2$O equivalent to less than about 0.8% by weight of the cement in the concrete, most preferably to less than about 0.6% by weight of cement in said concrete.

Using calcium nitrate as an example, the following reaction will occur:

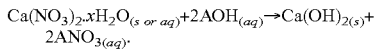
Ca(NO$_3$)$_2$·xH$_2$O$_{(s\ or\ aq)}$+2AOH$_{(aq)}$→Ca(OH)$_2(s)$+ 2ANO$_{3(aq)}$.

This reaction consumes hydroxyls and, provided that the salt is added in sufficient quantity, it limits the OH concentration to that provided by the calcium hydroxide. Note that even if the salt is added in great excess, the OH concentration will remain nominally the same, namely that of calcium hydroxide.

There is a specific advantage to an organic salt that has molar solubility close to that of calcium hydroxide. Additions of salts to the mixing water may cause acceleration of the rate of setting. This is undesirable when concrete is placed in warm weather. If the common ion effect of calcium on some of the organic salts is considered, their dissolution will be retarded by elevated calcium ion concentrations in solution. Thus, during the early hydration, the calcium entering solution as a result of cement hydration will inhibit the dissolution of organic Ca salts. However, as the Ca drops in response to Na and K entering solution, through the common ion effect of hydroxyl on the solubility of calcium hydroxide, then the organic salts will dissolve, and in doing so reduce the hydroxyl ion concentration. Using nitrate salts as examples of the reactions of interest are as follows:

(wherein A=Na and/or K)

Al(NO$_3$)$_3$·xH$_2$O$_{(s\ or\ aq)}$+3AOH$_{(aq)}$→Al(OH)$_3(s)$+ 3ANO$_{3(aq)}$

Fe(NO$_3$)$_3$·xH$_2$O$_{(s\ or\ aq)}$+3AOH$_{(aq)}$→Fe(OH)$_3(s)$+ 3ANO$_{3(aq)}$

Alternatively:

Fe(NO$_3$)$_3$·xH$_2$O$_{(s\ or\ aq)}$+3AOH$_{(aq)}$→FeOOH$_{(s)}$+ 3ANO$_{3(aq)}$

Fe(NO$_3$)$_2$·xH$_2$O$_{(s\ or\ aq)}$+2AOH$_{(aq)}$→Fe(OH)$_2(s)$+ 2ANO$_{3(aq)}$

Ca(NO$_2$)$_2$·xH$_2$O$_{(s\ or\ aq)}$+2AOH$_{(aq)}$→Ca(OH)$_2(s)$+ 2ANO$_{2(aq)}$

Ca(NO$_3$)$_2$·xH$_2$O$_{(s\ or\ aq)}$+2AOH$_{(aq)}$→Ca(OH)$_2(s)$+ 2ANO$_{3(aq)}$

Mg(NO$_2$)$_2$·xH$_2$O$_{(s\ or\ aq)}$+2AOH$_{(aq)}$→Mg(OH)$_2(s)$+ 2ANO$_{2(aq)}$

Mg(NO$_3$)$_2$·xH$_2$O$_{(s\ or\ aq)}$+2AOH$_{(aq)}$→Mg(OH)$_2(s)$+ 2ANO$_{3(aq)}$

Zn(NO$_2$)$_2$·xH$_2$O$_{(s\ or\ aq)}$+2AOH$_{(aq)}$→Zn(OH)$_2(s)$+ 2ANO$_{2(aq)}$

Zn(NO$_3$)$_2$·xH$_2$O$_{(s\ or\ aq)}$+2AOH$_{(aq)}$→Zn(OH)$_2(s)$+ 2ANO$_{3(aq)}$

Sr(NO$_2$)$_2$·xH$_2$O$_{(s\ or\ aq)}$+2AOH$_{(aq)}$→Sr(OH)$_2(s)$+ 2ANO$_{2(aq)}$

Sr(NO$_3$)$_2$·xH$_2$O$_{(s\ or\ aq)}$+2AOH$_{(aq)}$→Sr(OH)$_2(s)$+ 2ANO$_{3(aq)}$

Sn(NO$_2$)$_2$·xH$_2$O$_{(s\ or\ aq)}$+2AOH$_{(aq)}$→Sn(OH)$_2(s)$+ 2ANO$_{2(aq)}$

Sn(NO$_3$)$_2$·xH$_2$O$_{(s\ or\ aq)}$+2AOH$_{(aq)}$→Sn(OH)$_2(s)$+ 2ANO$_{3(aq)}$

The free water produced in these reactions is ignored. x may be 0 for anhydrous nitrates and nitrites or may be various numbers specific to a particular compound. Some nitrates and nitrite compounds may have a number of different hydrates, and in these cases there will be a range of possible values for x.

More generalized versions of the above equations are as follows:

Cat(An)$_2$·xH$_2$O$_{(s\ or\ aq)}$+2AOH$_{(aq)}$→Cat(OH)$_2(s)$+ 2AAn$_{(aq)}$

Cat(An)$_3$·xH$_2$O$_{(s\ or\ aq)}$+3AOH$_{(aq)}$→Cat(OH)$_3(s)$+ 3AAn$_{(aq)}$ where Cat refers to cation, An refers to anion, and A refers to alkali metal.

The possibility of the formation of a soluble intermediate ASn(OH)$_3$ is recognized. The above list is exemplary and not meant to be exhaustive, and 4 and 5 valent nitrates and nitrites can also be used:

Eg. Ti(NO$_3$)$_4$·xH$_2$O$_{(s\ or\ aq)}$+4AOH$_{(aq)}$→TiO$_2(s)$+ 4ANO$_{3(aq)}$

In another aspect, the present invention provides a method of reducing hydroxyl ions in concrete pore solutions, comprising adding an acidic phosphate to the concrete. Any suitable acidic phosphate can be used, so long as it has the ability to release a proton in exchange for picking up a Na$^+$ or K$^+$. Preferably, the acidic phosphate is phosphoric acid, monobasic phosphate, or dibasic phosphate, or combinations of these. The cation of the acidic phosphate can be selected from the group consisting of Na$^+$, K$^+$, NH$_4^+$ and combinations thereof. The acidic phosphate can be added to fresh concrete as a solid or as an aqueous solution, and can also be introduced into hardened concrete. It can also be used in an overlay over existing concrete, as described above. The amount used is as described above for addition of a salt.

The following reaction, by way of example only, illustrates this aspect of the present invention:

E.g. NaH$_2$PO$_{4(s\ or\ aq)}$+Na$^+$+OH$^-$→Na$_2$HPO$_{4(s\ or\ aq)}$+ HOH

In this, a buffering reaction, monobasic sodium phosphate is converted to dibasic sodium phosphate. In this conversion a proton is liberated and its reaction with an hydroxyl produces water. This class of reactions differs from those described above because a solid hydroxide is not precipitated.

In *The Chemistiy of Silica* by Iler, (FIG. 1.6, p. 42) the solubility of amorphous silica as a function of pH is shown. Solubility increases by a factor of about 10 or more between pH 9 and pH 11, and continues to increase with further pH elevation. Certain types of aggregate used in concrete contain silicate minerals which show elevated silica solubility at the pH values normally present in concrete pore solutions. The elevated pH values of these solutions are the result of the presence of alkali hydroxides.

It has been recognized that alkali silicates in liquid form may be added to concrete as a means of pore blocking. For example, potassium silicate solutions may be added to hardened concrete to react with available calcium hydroxide to produce calcium silicate hydrate. However, this would not be an acceptable means for mitigating the effects of ASR because the reactions involved also produce a potassium hydroxide solution.

As described above, basicities of concrete pore solutions can be reduced by the addition of salts comprised of a polyvalent cation and an anion of a strong acid. Another method to achieve a reduction in hydroxyl ion concentration is the direct addition of an appropriate acid species. The direct addition of an acid at the time of mixing of fresh concrete is theoretically possible, provided an appropriate acid could be found. Addition of an acid to hardened concrete is also theoretically possible, provided that such an acid could be found and could be made to intrude the concrete pore structure.

One such acid is silicic acid. It is also accepted that hydrous silica is an acid: $SiO_2 \cdot 2H_2O = H_4SiO_4$. Acidic silicates in solid form, including those present in fly ash, in silica fume, and in natural pozzolans, are routinely added to fresh concrete. Thus, a method by which hydrous silica could be added to in-place concrete also has the capability of reducing the alkali-silica reaction. Such a method involves the addition of a silicon-containing alkoxide. Commonly available alkoxides include tetramethyloxysilane (TMOS) $(CH_3O)_4Si$, tetraethyloxysilane (TEOS) $(C_2H_5O)_4Si$, and ethyl silicate 40. The latter is a solution of partially hydrolyzed TEOS comprised of oligomers containing on average 5 silicon atoms per oligomer. These alkoxides produce hydrous silica by a combination of hydrolysis and condensation reactions.

Using TEOS as an example the following hydrolysis reactions occur to produce an amorphous silicate:

$(C_2H_5O)_4Si + H_2O \rightarrow (C_2H_5O)_3SiOH + C_2H_5OH$.

$(C_2H_5O)_3SiOH + H_2O (C_2H_5O)_2Si(OH)_2 + C_2H_5OH$ $(C_2H_5O)_2Si(OH)_2 + H_2O\ C_2H_5OSi(OH)_3 + C_2H_5OH$ $C_2H_5OSi(OH)_3 + H_2O \rightarrow Si(OH)_4 + C_2H_5OH$ More broadly, these equations can be written as:

$(RO)_4Si + H_2O \rightarrow (RO)_3SiOH + ROH$.

$(RO)_3SiOH + H_2O \rightarrow (RO)_2Si(OH)_2 + ROH$ $(RO)_2Si(OH)_2 + H_2O \rightarrow ROSi(OH)_3 + ROH$ $ROSi(OH)_3 + H_2O \rightarrow Si(OH)_4 + ROH$ Each hydrolysis step produces a molecule of ethanol. Simultaneously, condensation reactions, such as the following, occur:

$(C_2H_5O)_3SiOH + (C_2H_5O)_3SiOH \rightarrow (C_2H_5O)_3SiOSi(C_2H_5O)_3 + H_2O$ or, more broadly, $(RO)_3SiOH + (RO)_3SiOH \rightarrow (RO)_3SiOSi(RO)_3 + H_2O$ The condensation reactions are polymerization reactions in which a simple molecule is eliminated from the silicate and an oxygen-silicon-oxygen bond is formed.

Thus, in an additional aspect, the present invention provides a method of reducing hydroxyl ions in concrete pore solutions, comprising adding a silicon-containing alkoxide to the concrete. The silicon-containing alkoxide has the formula $Si(OR)_{(4-x)}(OR')_x$, where x can be 1 to 4, R is an alkyl, alkenyl or alkynl group of one or more carbons, straight or branched, and each R can be the same or different from each other R or R'. Preferred silicon-containing alkoxides are tetramethyloxysilane, tetraethyloxysilane and ethyl silicate 40, a silicon-containing alkoxide that is partially hydrolyzed TEOS to achieve an Si content above 28% by weight, and optimally 40% by weight.

The length of the carbon chain in the alkoxide will be limited by the silicon-containing alkoxide's solubility in water. When the molecule becomes so insoluble (as with longer carbon chains) that it hydrolyzes very slowly or not at all, the compound will be inadequate for controlling the ASR reaction. As will be appreciated, the rate of hydrolysis is also a function of the pH of the solution and the susceptibility of aggregate materials to be attacked. The suitability of a particular silicon-containing alkoxide can be easily determined by one skilled in art without undue experimentation, using empirical methods such as testing the compound in concrete or in pore solutions for its ability to remove hydroxyl ions from the concrete or pore solution.

As with prior embodiments, the silicon-containing alkoxide can be added to fresh concrete, in solid or aqueous form, and introduced into hardened concrete in aqueous form. It can also be added to fresh concrete for use as an overlay over existing concrete, or is introduced into a hardened concrete overlay over existing concrete. The amount used will be an amount sufficient to provide a sufficient number of protons to reduce the effective $Na_2O$ content of the cement in the concrete to less than about 0.8% by weight of cement, more preferably to less than about 0.6% by weight of cement or less. In all of the above methods, the amount used can also be an amount sufficient to bring the effective $Na_2O$ equivalent to an amount which is less than the effective $Na_2O$ equivalent of the cement used in said concrete.

TABLE 1

| Compound | solubility g/100 cc | mol wt | molar solubility |
|---|---|---|---|
| Ca hydroxide | 0.16 | 72 | 0.0223 |
| Ca acetate | 37.4 (0) | 158 | 2.36 |
| Ca benzoate | 2.7 (0) | 336 | 0.08 |
| Ca butyrate | soluble | 268 | |
| Ca citrate | 0.85 (18) | 570 | 0.015 |
| Ca formate | 16.2 (20) | 130 | 1.25 |
| Ca fumarate | 2.11 (30) | 205 | 0.103 |
| Ca d-gluconate | 3.3 (15) | 448 | 0.074 |
| Ca glycerophosphate | 2 (25) | 210 | 0.19 |
| Ca isobutyrate | 20 | 304 | 0.658 |
| Ca lactate | 3.1 (0) | 308 | 0.101 |
| Ca maleate | 2.89 (25) | 172 | 0.168 |
| Ca methylbutryate | 24.24 (0) | 242 | 1.002 |
| Ca propionate | 49 (0) | 204 | 2.402 |
| Ca l-quinate | 16 (18) | 602 | 0.266 |
| Ca salicyate | 4 (25) | 350 | 0.114 |
| Ca valerate | 8.28 (0) | 242 | 0.342 |
| Ca nitrate | 121.2 (18) | 164 | 7.39 |
| Ca chromate | 16.3 (20) | 192 | 0.849 |
| Ca ferrocyanide | 80.8 (25) | 490 | 1.649 |
| Ca permanganate | 331 (14) | 368 | 8.995 |
| Ca MCPM | 1.8 (20) | 252 | 0.071 |
| Ca hypophosphate | 15.4 (25) | 170 | 0.906 |
| Mg(OH)2 | .0009 (18) | 58 | $5.6 \times 10^{-11}$ |
| Mg laurate | .007 (25) | 459 | $1.5 \times 10^{-4}$ |
| Mg myristrate | .006 (15) | 479 | $1.3 \times 10^{-4}$ |
| Mg oleate | .024 (5) | 587 | $4.1 \times 10^{-4}$ |
| Mg oxalate | .07 (16) | 148 | $4.7 \times 10^{-3}$ |
| Mg stearate | .003 (14) | 591 | $5.1 \times 10^{-5}$ | value in parenthesis is the temperature at which the solubility was determined.

TABLE 2

| Compound name | Formula | abbr | mol wt | sol. g/100 cc | at ° C. | Advantages or Disadvantages |
|---|---|---|---|---|---|---|
| aluminum nitrate nonohydrate | Al(NO3)3.9H2O | ANN | 375.13 | 63.7 | 25 | (−) sulfate attack |
| calcium nitrate tetrahydrate | Ca(NO3)2.4H2O | CNT | 236.15 | 266 | 0 | Stability |
| calcium nitrate anhydrous | Ca(NO3)2 | CN | 164.09 | 121 | 18 | question |
| calcium nitrite monohydrate | Ca(NO2)2.H2O | CAN | 150.11 | 45.9 | 0 | (−) expense |
| chromium nitrate | | | | | | (−) toxic |
| ferrous nitrate | | | | | | Stability question |
| ferric nitrate nonohydrate | Fe(NO3)3.9H2O | FNN | 404.2 | sol | | (−) color |
| ferric nitrate hexahydrate | Fe(NO3)3.6H2O | FNH | 348.4 | | | |
| copper nitrate hexahydrate | Cu(NO3)2.6H2O | | 295.64 | 243.7 | 0 | |
| copper nitrate trihydrate | Cu(NO3)2.3H2O | | 241.6 | 137.8 | 0 | |
| copper nitrate 2.5 hydrate | Cu(NO3)2.2.5H2O | | | | | |
| magnesium nitrate dihydrate | Mg(NO3)2.2H2O | MND | 184.35 | sol | | (+) expense |
| magnesium nitrate hexahydrate | Mg(NO3)2.6H2O | MNH | 256.41 | 125 | | |
| manganese nitrate tetrahydrate | Mn(NO3)2.4H2O | | 251.01 | 426.4 | 0 | |
| strontium nitrate anhydrous | Sr(NO3)2 | SN | 211.63 | 70.9 | 18 | |
| strontium nitrate tetrahydrate | Sr(NO3)2.4H2O | SNT | 283.69 | 60.43 | 0 | |
| zinc nitrate trihydrate | Zn(NO3)2.3H2O | | 243.43 | | | |
| zinc nitrate hexahydrate | Zn(NO3)2.6H2O | | 297.47 | 181.3 | 20 | | molality = (wt in g of solid)(1/mw)/1000 g of H2O. 10% soln = 100 g solid + 900 g H2O = 111.1 g solid/1000 g soln or 111.1 g of solid per 1000 g of sol'n

TABLE 3

| Formula | 10 wt % soln, molality | molality X moles NO3 | wt solid, g | wt H2O + Solid | wt % solid, g | soln pH | Wt NaOH/ Ca(OH)2 soln*, g | Wt of nitrate soln added, g | pH after add'n |
|---|---|---|---|---|---|---|---|---|---|
| Al(NO3)3.9H2O | 0.296 | 0.888 | 5.02 | 51.79 | 9.69 | 1.85 | 39.51 | 8.67 | 12.34 |
| Ca(NO3)2.4H2O | 0.47 | 0.92 | 5.2 | 52.08 | 9.98 | 5.38 | 41.76 | 13.61 | 12.36 |
| Ca(NO3)2 | 0.677 | 1.334 | | | | | | | |
| Ca(NO2)2.H2O | 0.74 | 1.48 | | | | | | | |
| Fe(NO3)3.9H2O | 0.274 | 0.822 | 5.04 | 54.07 | 9.32 | 0.3 | 39.44 | 11.64 | 12.46 |
| Fe(NO3)3.6H2O | 0.319 | 0.958 | | | | | | | |
| Cu(NO3)2.6H2O | 0.378 | | | | | | | | |
| Cu(NO3)2.3H2O | 0.46 | | 5.07 | 50.98 | 9.93 | | | | |
| Cu(NO3)2.2.5H2O | | | | | | 2.87 | | | |
| Mg(NO3)2.2H2O | 0.602 | 1.204 | | | | | | | |
| Mg(NO3)2.6H2O | 0.433 | 0.866 | 5.08 | 50.07 | 10.14 | 4.91 | 42.78 | 18.03 | 12.56 |
| Mn(NO3)2.4H2O | 0.443 | 0.886 | | | | | | | |
| Sr(NO3)2 | 0.525 | 1.05 | | | | | | | |
| Sr(NO3)2.4H2O | 0.392 | 0.784 | | | | | | | |
| Zn(NO3)2.3H2O | 0.456 | 0.912 | | | | | | | |
| Zn(NO3)2.6H2O | 0.373 | 0.746 | | | | | | | |

*0.3 M NaOH + 10 g Ca(OH)2 + 0.005 M Na2SO4 pH before any additions = 13.02

Accelerating admixtures containing calcium nitrate, calcium nitrite, and calcium formate have been added to fresh concrete to accelerate hydration in cool weather. However, the use of salts as ASR admixtures is distinguishable over the use of salts as accelerating admixtures.

Accelerating admixtures are used in cool weather and are applied to fresh concrete. ASR admixtures, on the other hand, may be used in warm weather and may be applied to concrete that is setting or hardened concrete. "Fresh concrete" refers to the aqueous or slurry-like mixture of water, cement, and aggregate that is mixed together to form new concrete. "Setting concrete" refers to concrete that is changing from a Slurry into a solid and has reached or passed through the "set point," which is the point at which the concrete is no longer in a plastic state. Concrete is considered to be setting once it has reached or passed through the time of initial set. "Setting speed" refers to the rate at which the concrete is setting. "Hardened concrete" refers to concrete that is substantially solidified. The alkali silica reaction may be treated in fresh concrete, concrete that is setting, or hardened concrete.

Accelerating admixtures are typically used at room temperature or below, with a preferred ambient temperature range of about 50° F. or below. WR Grace markets Daracel, a commercial accelerating admixture that contains calcium chloride, and recommends it for use at an ambient temperature of 50° F. and below. (The addition level for Daracel is 8-40 oz per 100 lb of cement.) Rear and Chin, Concrete Intl 12:55-58 (1990) tested non chloride accelerating admixtures at 10 and 22° C. Brook et al, Concrete Intl 12:55-58 (1990) tested non-chloride accelerating admixtures at 10 and 21° C. The ability of calcium formate to accelerate hydration is substantially diminished when the ambient temperature is raised from 70° F. to 100° F. At 70° F., the time of set decreases from about 3.25 hr to 2 hr in going from 0 to 2 percent calcium formate. At 100° F., the time of set decreases from about 1.25 to about 0.75 hr in going from 0 to 2 percent calcium formate. (V. S. Ramachandran: Concrete Admixtures Handbook, $3^{rd}$ Ed (1995))

When used as ASR admixtures in warm weather, salts may be combined with a retarding admixture such as calcium lignosulfonate or sodium and calcium salts of hydrocarboxylic acids, including salts of gluconic, citric, and tartaric acids. For example, calcium lignosulfonate may be added along with calcium nitrate. Such retarding agents would not be used in conjunction with an accelerating admixture.

When a salt such as calcium nitrate, calcium nitrite, or calcium formate is used as an ASR admixture, it may be mixed with other calcium salts not known to be accelerators, e.g., calcium acetate or calcium hydroxide. This would not be done if the salt is being used as an accelerating admixture. In addition, it is unlikely that calcium acetate would be used as an accelerator.

Another distinction is that the dosages of calcium nitrate, calcium nitrite, or calcium formate, when used as accelerating admixtures, vary depending on the temperature whereas the dosages of calcium nitrate, calcium nitrite, or calcium formate, when used as ASR admixtures, are independent of temperature and substantially depend on $Na_2O$ equivalent in the cement. For a given concrete mix design, the dosages of calcium nitrate, calcium nitrite, or calcium formate, when used as ASR admixtures, will be constant and will depend substantially on the alkali content of the cement, whereas the dosages of calcium nitrate, calcium nitrite or calcium formate, when used as accelerating admixtures, will depend on the temperature and on the desired rate of strength gain.

In the case of ASR admixtures, the addition of calcium nitrate, calcium nitrite, or calcium formate can be delayed anywhere from one day to several years following the mixture of fresh concrete. Even with a delayed addition, these salts will be effective at resisting ASR. However, when calcium nitrate, calcium nitrite, or calcium formate are used as accelerating admixtures, the addition of these compounds cannot be delayed. With a delayed addition, the salts will not be effective at accelerating hydration; the salts' ability to accelerate hydration decreases as the fresh concrete begins to set and harden. Furthermore, calcium nitrate, calcium nitrite, or calcium formate, when used as ASR admixtures, remain effective when introduced to the pore structure of concrete that has already hardened, whereas the introduction of calcium nitrate, calcium nitrite or calcium formate as accelerating admixtures would have no effect on the strength of hardened concrete.

An accelerating admixture is most effective at 1 day, somewhat less effective at 7 days, even less effective at 28 days, and of no importance at 1 year. The timeframe over which the alkali silica reaction occurs is minimally months and most importantly years. Thus, the timeframes during which ASR treatment is relevant do not overlap the timeframes during which acceleration is relevant. According to A. M. Paillere, Ed., Applications of Admixtures in Concrete (1995), calcium formate increases compressive strengths at 28 days, and calcium nitrite increases compressive strength at 1, 3, and 28 days (p. 40); calcium nitrate accelerates setting times (measured in hours) but only moderately accelerates hardening (p. 37).

To delay the release of an ASR admixture, the salt particles may be coated with a dissolving agent such as a polymer. In a particular embodiment, crystals of soluble salts, such as calcium nitrate or calcium nitrite, may be encased by coatings used in the formation of pharmaceutical tablets. Such coatings may include those used in time-release analgesics and would be intended to survive until final set or longer at which point they would dissolve and release the encased salts. The Aveka Group offers commercially available processes for coating particulate materials, including spray drying and prilling, and dry powder coating. The coating solution may contain dissolved polymer, sugar, inorganic salts, sol gels, or other dissolved materials. Methylcellulose or another time release coating may also be used. Delayed release would interfere with acceleration of the concrete, but would have no effect on control of ASR.

Table 4 below (from R. Rixom and N. Mailvagnam: Chemical Admixtures for Concrete, 3rd Ed (1999), p. 183) shows the effects of calcium nitrite on strength development.

TABLE 4

| | Compressive strength, MPa | | |
|---|---|---|---|
| % admixture | 1 day | 7 days | 28 days |
| 0 | 9.0 | 23.5 | 24.7 |
| 2 | 11.1 | 31.3 | 39.5 |
| 3 | 13.5 | 34.2 | 40.7 |
| 4 | 15.8 | 36.8 | 44.0 |
| 5 | 16.3 | 36.7 | 44.8 |
| | No statistically meaningful change beyond 3–4% | No statistically meaningful Change beyond 3% | No statistically meaningful change beyond 2% |

It appears that the broad range for use of a salt as an accelerator is about 2 to 5 percent, with a preferred range of about 3 percent or below for calcium nitrite and 2 percent or below for calcium formate (V. S. Ramachandran: Concrete Admixtures Handbook, $3^{rd}$ Ed (1995)).

This illustrates another difference between the use of salts as accelerators and the use of salts as ASR admixtures. The amount of ASR admixture added to the concrete is directly proportional to the quantity of hydroxyl ions removed from the pore solution. For every mole of an ASR admixture comprised of calcium nitrate, calcium nitrite, or calcium formate added to a given amount of concrete, two moles of hydroxyl ions will be removed as $Ca(OH)_2$. Thus, the relationship between the amount of ASR admixture and the amount of hydroxyl ions removed from the pore solution may be a straight line.

Another distinction is that calcium nitrite as an accelerator has been combined with calcium rhodonate-triethylamine to achieve acceleration (V. S. Ramachandran: Concrete Admixtures Handbook, $3^{rd}$ Ed (1995), p. 170). This would not be the case if calcium nitrite was used as an ASR admixture. In addition, use of calcium nitrate in conjunction with triethanolamine as an accelerating admixture was proposed in 1981

(V. Dodson, Concrete Admixtures, 1990, p. 92). Such would not be the case when calcium nitrate is used as an ASR admixture. Moreover, calcium nitrite would not typically be added unless there was a concern for corrosion of embedded steel.

Calcium formate accelerates hydration of tricalcium silicate, but not beyond about 2 percent addition (V. S. Ramachandran: Concrete Admixtures Handbook, $3^{rd}$ Ed (1995), p. 257). This is also in accord with (V. Dodson, Concrete Admixtures, 1990). Enhancing the reactivity of tricalcium silicate is required to achieve meaningful acceleration. The use of calcium formate as an ASR admixture is not subject to such a limitation. According to A. M. Paillere, Ed., Applications of Admixtures in Concrete (1995), p. 37, a consensus document produced by a RILEM committee populated by experts on chemical admixtures, calcium formate is sometimes blended with other compounds, such as sodium nitrite, to enhance early strength development. This would never be done if calcium formate were used as an ASR admixture.

Rixom and Mailvagnam teach there to be negligible effect on acceleration when an accelerating admixture contains more than 4 percent of calcium nitrite (R. Rixom and N. Mailvagnam: Chemical Admixtures for Concrete, $3^{rd}$ Ed (1999)). The use of calcium nitrite as an ASR admixture is not subject to such a limitation.

The addition of a low solubility double salt containing calcium cations and monovalent anions may also interfere with ASR. For example, $Ca(NO_2)_2.Ca(OH)_2.xH_2O$ (where x is a whole number ranging from about 0 to 4) may interfere with ASR in proportion to the amount of $Ca(NO_2)_2$ present in the salt. Because the double salt exhibits a lower solubility than $Ca(NO_2)_2$ alone, it would exhibit diminished or negligible effect on acceleration by comparison. However, because the times and modes of action between set acceleration and control of ASR differ, this salt would be effective for control of ASR. A double salt of calcium hydroxide or calcium nitrate may also be used.

The addition of a mixture containing from about 40 to 60 percent of nitrate ($NO_3$) ions and about 60 to 40 percent of nitrite ($NO_2$) ions may be employed to interfere with ASR. For example, Gaidis (Cem. Concr. Comps. 26: 181-89 (2004)) reported a 50-50 mixture of nitrate ($NO_3$) and nitrite ($NO_2$) ions that is produced when $NO_2$ gas is bubbled into an alkaline aqueous medium. Accordingly, the following reaction would occur if the alkaline medium were a calcium hydroxide solution: $2NO_2+2OH^-$ [which could be supplied by $2Ca(OH)_2] \rightarrow NO_2^-$ and $NO_3^-$ and $H_2O$. Giving explicit consideration to the presence of calcium, the following reaction would occur: $4NO_2+2Ca(OH)_2 \rightarrow Ca(NO_2)_{2(aq)}$ and $Ca(NO_3)_{2(aq)}+2H_2O$. There is no need to subsequently separate the nitrate and nitrite (which is economically advantageous) because they will act in combination as an admixture to control ASR. It does not appear that such a combination has been used either as an accelerator or in the case of calcium nitrite as a corrosion inhibitor.

The following examples are intended to illustrate the invention and should not be construed as limiting the invention in any way.

It is understood in the art that a low alkali cement contains less than about 0.6 wt % of $Na_2O$ equivalent. $Na_2O$ equivalent is the total amount of both $Na_2O$ and $K_2O$ present in the cement, reported as $Na_2O$ equivalents. Recognizing that $Na_2O+2H_2O \rightarrow 2NaOH$, one can calculate the amount of a salt that is required to reduce the effective $Na_2O$ equivalent to the desired value. The following examples illustrate one embodiment of the present invention, in which there is added sufficient salt to bring the effective $Na_2O$ equivalent to this 0.6% value.

EXAMPLE 1

Assume a cement with an $Na_2O$ equivalent of 1%. To convert this to a low alkali cement, 0.4 wt % of $Na_2O$ needs to be neutralized. Assume a typical mix design called for 5.5 sacks of cement per cubic yard and a water-to-cement ratio of 0.5 by weight. A sack of cement weighs 94 pounds. Consequently, the total $Na_2O$ equivalent would be 5.5×94×0.01=5.17 lb. To bring this value down to an $Na_2O$ equivalent 0.6% requires neutralization of 0.4×5.17=2.07 lb. If the preferred admixture is $Ca(NO_3)_2$ then on a molar basis, $Na_2O+2H_2O+Ca(NO_3)_2 \rightarrow Ca(OH)_2+2NaNO_3$. Thus, one mole of $Ca(NO_3)_2$ would be required for each mole of $Na_2O$ to be neutralized.

Based on the molecular weights per mole, neutralization of 62 g of $Na_2O$ would require 164 g of $Ca(NO_3)_2$. This ratio is 2.65. Thus, 2.07 lb of $Na_2O$ would require the presence of 5.48 lb of $Ca(NO_3)_2$ per cubic yard of concrete. If the water-to-cement ratio were 0.5, the concrete would be made by mixing the cement with 5.5×94×0.5=258.5 lb of water per cubic yard. Calcium nitrate can be added to this mixing water as crystals that would readily dissolve.

EXAMPLE 2

An alternative method for reducing hydroxyl ions in concrete is to limit the total alkali content in a cubic yard of concrete. The alkali content in a cubic yard of concrete will increase as the cement content of the concrete increases. If one mix uses 4.5 sack per cubic yard while another uses 7 sack per cubic yard of the same cement, the alkali content of the 7 sack mix will be 7/4.5=1.56 times higher than that of the 4.5 sack mix. In metric units alkali silica reaction is not considered a problem as the $Na_2O$ equivalent is in the range of 1.8 to 3 kilograms per cubic meter (1.31 cu yard). Assume a typical cement content of 13 weight percent and a typical weight of a cubic meter of concrete to be 2400 kg and a $Na_2O$ equivalent of 1%. Thus the total alkali equivalent will be 2400×0.13× 0.01=3.12 kg for the equivalent of a 5.5 sack mix and 4.87 kg for a 7 sack mix. In the latter instance a reduction of the content to a maximum of 3 kg per cubic meter would require the addition of sufficient $Ca(NO_3)_2$ to reduce the $Na_2O$ equivalent by 1.87 kg/cubic meter. Again, according to the reaction $Na_2O+2H_2O+Ca(NO_3)_2 \rightarrow Ca(OH)_2+2NaNO_3$, this would require the addition of 4.95 kg of calcium nitrate.

EXAMPLE 3

Use of an Organic Salt

Assume a cement with an $Na_2O$ equivalent of 1%. To convert this to a low alkali cement, 0.4 wt % of $Na_2O$ needs to be neutralized. Assume a typical mix design called for 5.5 sacks of cement per cubic yard and a water-to-cement ratio of 0.5 by weight. A sack of cement weighs 94 pounds. Consequently, the total $Na_2O$ equivalent would be 5.5×94×0.01=5.17 lb. To bring this value down to an $Na_2O$ equivalent 0.6% requires neutralization of 0.4×5.17=2.07 lb. If the preferred admixture is calcium acetate then on a molar basis, $Na_2O+2H_2O+Ca(Ac)_2 \rightarrow Ca(OH)_{2(solid)}+2NaAc$. Thus, one mole of $Ca(Ac)_2$ would be required for each mole of $Na_2O$ to be neutralized.

Based on the molecular weights per mole, neutralization of 62 g of $Na_2O$ would require 158 g of $Ca(NO_3)_2$. This weight ratio is 2.55. Thus, 2.07 lb of $Na_2O$ would require the presence of 5.28 lb of $Ca(Ac)_2$ per cubic yard of concrete. If the water-to-cement ratio were 0.5, the concrete would be made by mixing the cement with 5.5×94×0.5=258.5 lb of water per cubic yard. Calcium acetate can be added to this mixing water as crystals that would readily dissolve.

EXAMPLE 4

Use of a Free Organic Acid

Assume a cement with an $Na_2O$ equivalent of 1%. To convert this to a low alkali cement, 0.4 wt % of $Na_2O$ needs to be neutralized. Assume a typical mix design called for 5.5 sacks of cement per cubic yard and a water-to-cement ratio of 0.5 by weight. A sack of cement weighs 94 pounds. Consequently, the total $Na_2O$ equivalent would be 5.5×94×0.01=5.17 lb. To bring this value down to an $Na_2O$ equivalent 0.6% requires neutralization of 0.4×5.17=2.07 lb. If the preferred admixture is oxalic acid then on a molar basis, $Na_2O+2H_2O+HO_2CCO_2H \rightarrow Na_2(COO)_2$. Thus, one mole of oxalic acid would be required for each mole of $Na_2O$ to be neutralized.

Based on the molecular weights per mole neutralization of 62 g of $Na_2O$ would require 90 g of oxalic acid. This weight ratio is 1.45. Thus, 2.07 lb of $Na_2O$ would require the presence of 3 lb of oxalic acid per cubic yard of concrete. If the water-to-cement ratio were 0.5, the concrete would be made by mixing the cement with 5.5×94×0.5=258.5 lb of water per cubic yard. Oxalic acid can be added to this mixing water as crystals. Alternatively oxalic acid dehydrate crystals could be added provided the proportions were altered to consider the molecular weight difference.

EXAMPLE 5

Use of an Alkoxide

Assume a cement with an $Na_2O$ equivalent of 1%. To convert this to a low alkali cement, 0.4 wt % of $Na_2O$ needs to be neutralized. Assume a typical mix design called for 5.5 sacks of cement per cubic yard and a water-to-cement ratio of 0.5 by weight. A sack of cement weighs 94 pounds. Consequently, the total $Na_2O$ equivalent would be 5.5×94×0.01=5.17 lb. To bring this value down to an $Na_2O$ equivalent 0.6% requires neutralization of 0.4×5.17=2.07 lb. TEOS, tetraethyl oxysilane is a liquid at room temperature which has a limited solubility in water. In the proportions needed it will be soluble with the mixing water used to produce concrete. TEOS liquid will be added to the mixing water and will hydrolyze to produce oligomers of approximate composition $Si_nO_{(2n+1)}H_{(n+2)}$. These will react in turn with Na and hydroxyls to produce $Na_2SiO_3.9H_2O$. Thus, 1 mole of $Na_2O$ is consumed per mole of TEOS. On a weight ratio basis, 208 g of TEOS are required per 62 g of $Na_2O$. Thus to neutralize 2.07 lb of $Na_2O$ will require 6.94 lb of TEOS. Given a density of TEOS liquid of about 1.4, this will require about 0.5 liter per cubic yard of concrete.

EXAMPLE 6

Remediation of Existing Concrete

The reaction in concrete presently undergoing ASR can be stopped by allowing solution containing calcium nitrate to soak into the concrete. As this occurs, the reaction $2NaOH+2H_2O+Ca(NO_3)_2 \rightarrow Ca(OH)_2+2NaNO_3$ will propagate.

A similar reaction will occur in the event the alkali is potassium. In this case the reaction $2KOH+2H_2O+Ca(NO_3)_2 \rightarrow Ca(OH)_2+2KNO_3$ will propagate. Application to hardened concrete pavements can be accomplished by spraying using equipment equivalent to that used to apply liquid de-icing salts. Application to horizontal or vertical surfaces can be accomplished by saturating porous materials, including but not limited to paper, cloth, or burlap, and placing them in direct contact with the concrete. This recognizes that means to limit the rate of evaporation, such as covering with plastic sheeting, should be employed.

Rather than employing a soft material, such as cloth, paper or burlap, the salts needed to interfere with ASR can be employed by incorporating them into a porous overlay. Such an overlay could be concrete, mortar, or asphaltic material.

In alternative embodiments of the present invention, methods are provided for healing cracks and fissures in hardened concrete while at the same time mitigating ASR by reducing hydroxyl ion concentrations. An Si-containing alkoxide may be introduced to the concrete where it reacts with a source of calcium to form calcium silicate hydrate that reduces the volume of cracks and fissures in the concrete by filling or at least partially filling the crack and fissure space. Such introduction also further hardens the concrete thereby making it more resistant to wear, spalling, and other damage. Methods are also provided for bonding new concrete to existing concrete while at the same time mitigating ASR by reducing hydroxyl ion concentrations and healing cracks and fissures. An Si-containing alkoxide may be introduced to the existing concrete before the casting of new, fresh concrete on top. The Si-containing alkoxide reacts with a source of calcium to mitigate ASR by reducing hydroxyl ions and to form calcium silicate hydrate that bonds the new concrete to the existing concrete and reduces the volume cracks and fissures in the concrete by filling or at least partially filling the crack and fissure space. The terms "cracks" and "fissures" are used interchangeably herein. They refer to any crack, microcrack, fissure, break, crevice, or cavity in concrete that has been caused by deterioration, the alkali silica reaction, chemical shrinkage, plastic shrinkage, application of mechanical loads, manipulation of the concrete (e.g., surface preparation), or the like.

The Si-containing alkoxide may be any alkoxide or partially hydrolyzed alkoxide that is capable of participating in a reaction to produce a reactive form of anhydrous silica (e.g., $SiO_2$), reactive silicate oligomers, any silica hydroxide (e.g., $Si(OH)_4$), or a combination thereof. An example of a suitable Si-containing alkoxide that may be used in accordance with the present invention is tetraethyloxysilane ("TEOS"), which has the molecular formula $Si(OC_2H_5)_4$ and is also known as ethyl silicate. The Si-containing alkoxide known as tetramethyloxysilane ("TMOS"), which has the molecular formula $Si(OCH_3)_4$ may also be used in accordance with the present invention. Another example of a suitable Si-containing alkoxide is partially hydrolyzed TEOS, which is referred to herein as "ethyl polysilicate." Ethyl polysilicate is TEOS that has been partially hydrolyzed to produce oligomers containing $Si-O-Si$ bonds, some $S_1-OC_2H_5$ bonds, and some $Si-OH$ bonds. In general, any compound having the formula $Si(OR)_4$ may be used as the Si-containing alkoxide, where R has the formula $C_nH_{(2n+1)}$ and n is a whole number ranging from about 1 to 8. In addition, any compound having the formula $Si(OR)_{(4-x)}(OR')_x$ may be used as the Si-containing alkoxide, where x ranges from about 0 to 4, and R and R' are different organic groups each having the formula $C_nH_{(2n+1)}$ where n is a whole number ranging from about 1 to 8. Furthermore, any compound having the formula $Si(OR)_{(4-x)}(OR')_x$, where x ranges from about 0 to 4, and R and R' are different organic groups each having the formula $C_rZ_sH_t$, where r is a whole number ranging from 1 to about 6, s is a whole number ranging from r+1 to about 2r+1, Z is selected from the group consisting of H, OH, O, $NH_2$, pendant groups of $-C_rH_{r+1}$, and pendant groups which may also contain H, OH, O, and $NH_2$ functionalities; C—C single bonds may be replaced by C=C double bonds. The variable t is a whole number ranging from 0 to about 2r+1 and has the value required to give each carbon atom four bonds. If each bond is a single bond, then carbon will be bonded to four other atoms. If carbon-carbon double bonds are present, then each of the carbons will be bonded to three other atoms.

For certain applications, it may be preferable to use ethyl polysilicate as the Si-containing alkoxide because it has a low toxicity. Ethyl polysilicate is formed from the partial hydrolysis of TEOS, which involves the displacement of ethanol groups with water to produce Si—OH and $C_2H_5OH$ (ethyl alcohol). Ethyl polysilicate and TEOS are chemically different compounds because the partial reaction of TEOS with water results in some ethanol groups being replaced by OH groups and the formation of some Si—O—Si bonds. This produces a liquid comprised of short chained polymers called oligomers. While the bulk composition of an ethyl polysilicate can be stated, its precise chemical makeup cannot be because a range of compounds will be present. TEOS, on the other hand, is monomeric.

The partial reaction of TEOS with water reduces the volatility of ethyl polysilicate, reduces its ethanol content, and increases its $SiO_2$ content from about 28 to 40 or 45 weight percent. $SiO_2$ contents higher than this can be achieved, but the stabilities are reduced. It is desirable for the $SiO_2$ content in the Si-containing alkoxide to range from about 1 to 45 percent. The $SiO_2$ content is preferably about 40 percent, and an $SiO_2$ content of about 45 percent is even more preferred. An example of an ethyl polysilicate is Silbond 40, which contains about 40 weight percent silica.

When cement hydrates, two compounds, tricalcium silicate ($3CaO.SiO_2$) and dicalcium silicate ($2CaO.SiO_2$), react to form calcium silicate hydrate and calcium hydroxide according to the following reactions:

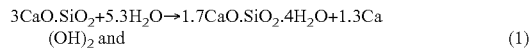

$$3CaO.SiO_2 + 5.3H_2O \rightarrow 1.7CaO.SiO_2.4H_2O + 1.3Ca(OH)_2 \text{ and} \quad (1)$$

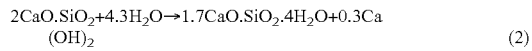

$$2CaO.SiO_2 + 4.3H_2O \rightarrow 1.7CaO.SiO_2.4H_2O + 0.3Ca(OH)_2 \quad (2)$$

These are the primary reactions which impart mechanical properties to Portland cement concrete. Calcium silicate hydrate is the primary binder in Portland cement concrete.

The present invention contemplates the use of calcium silicate hydrate and/or calcium hydroxide in cement as the "source of calcium" that reacts with the Si-containing alkoxide. Alternatively, calcium oxide and/or calcium hydroxide may be intentionally added to cement or fresh concrete for use as the "source of calcium."

When the Si-containing alkoxide and the source of calcium combine, a form of the pozzolanic reaction occurs to form calcium silicate hydrate:

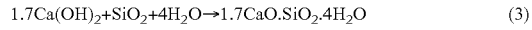

$$1.7Ca(OH)_2 + SiO_2 + 4H_2O \rightarrow 1.7CaO.SiO_2.4H_2O \quad (3)$$

The calcium silicate hydrate produced is a solid material that fills or at least partially fills cracks and fissures in the concrete. This phenomenon is referred to herein as "healing" the cracks and fissures in the concrete. The Si-containing alkoxide may also reduce ASR in the concrete by reducing hydroxyl ions through the following reactions:

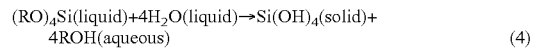

$$(RO)_4Si(liquid) + 4H_2O(liquid) \rightarrow Si(OH)_4(solid) + 4ROH(aqueous) \quad (4)$$

[Note: $Si(OH)_4$(solid)=$H_4SiO_4$=silicic acid]

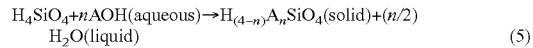

$$H_4SiO_4 + nAOH(aqueous) \rightarrow H_{(4-n)}A_nSiO_4(solid) + (n/2)H_2O(liquid) \quad (5)$$

AOH is a base containing hydroxl ions, A is a monovalent cation, and R is an organic group having the formula $C_nH_{(2n+1)}$, where n is a whole number ranging from 1 to 8.

It has been understood since Roman times that solids containing reactive silica undergo the pozzolanic reaction. Then, the reactive source of silica was derived from volcanoes. Today, it is conventional to use fly ash derived from the combustion of coal. Both volcanic ash and fly ash are solids. There are also technologies which use liquid silicates such as sodium and potassium silicate to consolidate or heal cracks in concrete. The following reaction is an example:

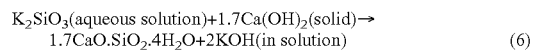

$$K_2SiO_3(\text{aqueous solution}) + 1.7Ca(OH)_2(solid) \rightarrow 1.7CaO.SiO_2.4H_2O + 2KOH(\text{in solution}) \quad (6)$$

However, reactions of these alkali silicates with reactive sources of calcium produce solutions which are strongly basic due to the generation of KOH and NaOH. The present invention, which utilizes an Si-containing alkoxide, avoids the formation of basic compounds such as KOH and NaOH.

The Si-containing alkoxide may be introduced to the hardened concrete as a solution at room temperature. Introduction of the Si-containing alkoxide can be accomplished using any suitable technique that allows the solution to infiltrate the cracks and fissures of the concrete. Suitable techniques may include, but are not limited to injection, soaking, spraying, and application under pressure.

Ethyl polysilicate forms solutions having low viscosities at room temperature (~5 cps for Silbond 40 and ~9 cps for Silbond 50; water is ~0.89 cps) that will wet a concrete surface and thereby will be drawn into the concrete porosity. This is desirable to ensure that a zone of reaction occurs. Thus, the reaction that occurs when the Si-containing alkoxide interacts with the source of calcium may extend some distance into the existing concrete. This is of importance because it provides a mechanism for healing cracks and fissures at various depths which may be present in the existing concrete either because of its deterioration, because of the alkali silica reaction, chemical shrinkage, plastic shrinkage, application of mechanical loads, or manipulation of the concrete (e.g., surface preparation).

Over time, the solution containing the alkoxide undergoes hydrolysis and condensation reactions which convert the liquid to solid. This process is called gelation. As gelation occurs, the viscosity of the solution increases. The rates of gelation processes can be controlled by the presence of co-solvents, the reaction temperature, the addition of catalysts, the addition of acids or bases, or a combination thereof. Co-solvents may include water, ethanol, and methanol. Catalysts may include alkali silicate solutions which are basic, or certain salts such as $NaH_2PO_4$ which are made by partially neutralizing acids and can produce acidic solutions. Mineral and organic acids may be utilized, including but not limited to HCl, $H_2SO_4$, $HNO_3$, and oxalic acid. An example of a suitable base is NaOH, although the invention contemplates the use of numerous other bases. In addition, a lithium-containing compound such as lithium polysilicate or a lithium alkoxide may be introduced along with the Si-containing alkoxide to interfere with the progression of ASR.

It is understood that the amount of hydroxyl ions added to achieve base catalysis is well below the number that can be consumed by reaction of the silica-containing alkoxide.

The viscosity of an Si-containing alkoxide solution during hydrolysis and condensation reactions may be adjusted by adding small amounts of acid or base (see, e.g., Brinker and Sherer, *Sol Gel Science*, FIG. 5, pg. 104 and FIGS. 10a & b, pg. 120). Hence, a small amount of an alkali silicate could be added to an Si-containing alkoxide solution to provide the base needed to initiate these reactions. Mechanistically, addition of acid or base to the solution can facilitate the onset of hydrolysis and condensation causing an increase in viscosity. Hydrolysis is the displacement of ethanol groups in favor of forming hydroxyl groups. Condensation is polymerization in which —Si—OH+HO—Si— functionalities react to form —Si—O—Si—+$H_2O$. Such reactions will permit the existing concrete surface to be infilled with reactive silicon oxide-containing compounds. The depth of infilling will depend on the viscosity of the Si-containing alkoxide.

Base catalysis may produce gels with densities of ~0.83 g/cc. Acid catalysis may produce gels with densities of ~1.5 g/cc. Thus, either base catalysis or acid catalysis can be selected depending on the application. Lower density gels will fill more bulk space, contain more intrinsic porosity, have higher specific surface areas, and be more reactive towards calcium to form calcium silicate hydrate.

For certain applications, it may be desirable to focus on healing the surface of the concrete, in which case, a TEOS or ethyl polysilicate solution may be combined with colloidal silica to increase the viscosity of the solution. In one embodiment, new concrete may be bonded to old concrete by spraying TEOS or TEOS/colloidal silica solutions onto the surface to be bonded. This misting will create a thin layer of hydrous silica which will convert to CSH once the new concrete is placed over it. In another embodiment, a TEOS-Ca(OH)$_2$-water grout may be applied to the surface of the concrete with a trowel.

For applications involving drilling holes in "mass concrete" such as dams, where ASR is of concern, the use of TEOS may in some instances be preferable over the use of ethyl polysilicate. Although TEOS contains less silicon than ethyl polysilicate, TEOS contains more alcohol. Evolution of a non-aqueous polar liquid within the concrete porosity will lower the chemical reactivity of water. A water-alcohol mixture will produce a solution which will interfere with the progression of ASR. Thus, in a preferred embodiment, the Si-containing alkoxide may be diluted with alcohol. The alcohol could be ethanol or methanol or other alcohols which are soluble in water and which will act as a solvent for TEOS or ethyl polysilicate (Brinker and Sherer, Table 3, p 113).

In another embodiment of the present invention, an Si-containing alkoxide may be used as a bonding agent to adhere new concrete to existing concrete. As used herein, the term "new concrete" shall refer to newly mixed, fresh concrete that is cast over existing concrete and all of the phases that the concrete passes through as it sets and hardens to form a new concrete mass. In addition to serving as a bonding agent, the Si-containing alkoxide will mitigate ASR by reducing hydroxyl ions, and heal cracks in the new concrete and existing concrete by forming calcium silicate hydrate.

When new, fresh concrete is cast against existing concrete it tends to adhere. As the fresh concrete hardens it undergoes a phenomenon called chemical shrinkage. Chemical shrinkage occurs because, while the solids created during hydration take up more space than did the solids from which they formed, these new solids take up less total space than the combination of the reactant solids and water. Thus, while the volume of space that is filled by solids increases, the total volume decreases. In other words, while the newly formed water-containing solid occupies more space than did the original solid from which it formed, it occupies less space than the original solid+water from which it formed As the hardening concrete undergoes shrinkage, it typically exceeds the strain capacity at the interface between the new and the existing concrete. In other words, the dimensional changes the new concrete undergoes are greater than can be withstood without cracking. Thus, a network of cracks develops in the new concrete near the interface between the new and existing concrete. These cracks can be consolidated or "healed" if calcium hydroxide or calcium silicate from either the existing or the new concrete can react with a source of reactive silica to form additional calcium silicate hydrate. It is important for the reaction not to occur too rapidly and not before the period of significant dimensional change is over.

The calcium silicate hydrate can form while the new concrete is setting or after the new concrete has hardened. The calcium silicate hydrate can continue to form after the new concrete has undergone chemical shrinkage and particularly after the new concrete has undergone chemical shrinkage to a substantial degree of completion.

Ethyl polysilicate which is undergoing hydrolysis and condensation may form a ductile substance at or near the surface of the existing concrete. The presence of ethyl polysilicate adjacent to the free surface will produce an interfacial region which exhibits ductility (a substantially continuous ductile layer). The presence of such an interfacial region will accommodate to the dimensional changes occurring during chemical shrinkage. Applying the ethyl polysilicate under conditions where a surface layer of ethyl polysilicate forms on the existing concrete will result in its intermingling with the new concrete and will assure the absence of a sharp interface which is more susceptible to cracking.

When the new, fresh concrete is cast over the existing concrete, the cement in the fresh concrete will hydrate as described hereinabove and will produce calcium hydroxide. The calcium hydroxide so produced will react with the silica oxide compounds present from the Si-containing alkoxide to produce more of the calcium silicate hydrate binder. Formation of this binder in cracked concrete is understood to heal cracks and fissures. This process is called autogeneous healing. Thus, intentionally placing constituents needed for autogeneous healing in proximity will permit cracks to be repaired in both the new concrete and the existing concrete.

The following examples are intended to illustrate the invention and should not be construed as limiting the invention in any way.

EXAMPLE 7

Treatment of an Existing Concrete Surface to Facilitate Bonding with New Concrete Ethyl polysilicate, such as commercially available Silbond 40 or Silbond 50 from Silbond Corporation, may be applied to the surface of existing concrete. Typically, the existing concrete surface has been abraded or treated to remove loose and friable material, grease, oil, paint and the like. Application may be accomplished by a variety of means including but not limited to spraying under applied pressure, spraying as a consequence of gravity as from a moving truck, swabbing or puddling. Depending on the specific requirements, multiple applications may be required.

As ethyl polysilicates have viscosities not greatly different from that of water and because they wet the concrete, they will tend to adsorb into the concrete pore structure by capillary forces. The extent to which this occurs and the rate at which it occurs can be changed by the addition of acid or base. To control adsorption the ethyl silicate is acidified to achieve a pH value in the range of 3 to 5 with a value of 4 being preferred. Acidification is achieved by the physical addition of an acidic solution to the ethyl silicate. Acidification catalyzes the hydrolysis/condensation reaction sequence. While acidification can be accomplished using a variety of mineral and organic acids, oxalic or nitric acids are preferred. HCl should be avoided if there is concern with regard to accelerating corrosion of embedded metals. $H_2SO_4$ should be avoided if there is concern for sulfate attack of the concrete being treated. After the addition of acid there will be an increase in viscosity which should be monitored by observation of the change in fluidity. Alternatively, and preferentially, the acidified ethyl polysilicate can be applied to a test area. Once the appropriate aging time has been established by direct observation, this value can continue to be used as long as other conditions, such as ambient temperature, the temperature of the concrete surface, and the moisture content of the concrete do not change. However, for applications requiring more than an hour or covering more than about 1000 square feet of surface, preparation of smaller batches may avoid undesirable variations in behavior. Application should result in a surface layer whose thickness ranges from about 60 microns (the typical distance between aggregate in concrete) to about 500 microns (where there may be local depressions in the existing surface), but the optimal thickness will be in the range of 100-150 microns.

Application of acidified ethyl polysilicate to an existing concrete surface also anticipates that fresh concrete will be placed in apposition to that surface without a lengthy delay. Construction processes, however, are notoriously difficult to schedule; the acceptable duration between application of acidified ethyl polysilicate and the application of the fresh concrete will again depend on the ambient temperature and humidity. Once applied, the acidified ethyl polysilicate should not react to the point that it has become a continuous solid. Rather, the fresh concrete should be cast when the ethyl silicate coating has a slush-like texture.

EXAMPLE 8

Base Catalysis

Example 8 is similar to Example 7 except that the hydrolysis/condensation reaction sequence is catalyzed by base. Catalysis requires a pH between 9.5 and 12.5 with a value near 10 preferred. A variety of bases can be used. These include, but are not limited to, solutions of NaOH, KOH, $NH_4OH$, $Ca(OH)_2$ and basic alkali silicates. Among these, NaOH and $Ca(OH)_2$ are preferred.

EXAMPLE 9

Base Catalysis with Lithium Hydroxide

Example 9 is similar to Example 7 except that the hydrolysis/condensation reaction sequence is catalyzed by base. Catalysis requires a pH between 9.5 and 12.5 with a value near 10 preferred. Use of lithium polysilicate solution, in particular, can result in base catalysis of the hydrolysis/condensation reactions of ethyl polysilicate while also supplying Li ions, which are known to interfere with the progression of the alkali silica reaction.

EXAMPLE 10

Dual Function of Consolidation and Interfering with ASR

Ethyl polysilicate serves dual functions of consolidating concrete exhibiting cracking as a consequence of the alkali silica reaction and interfering with the reaction itself. To accomplish these dual functions in concrete that has been subjected to ASR it is desirable to achieve significant penetration. This is achieved by drilling holes into the concrete and forcing ethyl silicate under an applied pressure. The depth of penetration, the spacing between penetrations, the applied pressure, the duration of each application and the number of times ethyl silicate is forced into each hole will depend on the geometry of the concrete and on its condition. Doing so will create boluses of unreacted ethyl silicate that will migrate more deeply into the surrounding concrete over time. Under this circumstance, it is desirable to apply ethyl silicate exhibiting a minimal viscosity to ensure its migration over as large a distance as possible.

EXAMPLE 11

Achieving Deep Penetration into a Concrete Structure

Deep penetration may be achieved by extending the period prior to the onset of the hydrolysis/condensation reaction sequence. This can be done by avoiding acid or base catalysis. The depth of penetration can also be increased by desiccation of the porosity. This can be accomplished by means which temporarily limit exposure to moisture, or by drying using fans, or warming. However, warming a structure will also accelerate the rate of reaction. As the rates of hydrolysis/condensation are temperature dependent, application at temperatures below about 70 F, will delay the onset and the completion of these processes.

EXAMPLE 12

Extending Gelation Time

Gelation time can also be extended by dilution with ethanol. Such time will be extended in proportion to the extent of dilution.

EXAMPLE 13

Deep Penetration After Surface Sealing

Deep penetration can be combined with surface sealing. Surface sealing can generally be accomplished as described in Example 7, providing, however, that application for this purpose does not require the viscosities needed to ensure a surface layer is present. Hydrolysis/condensation can then be initiated to seal the surface by spraying with an acidic or basic solution. Optimally, this solution is a saturated $Ca(OH)_2$ solution also containing suspended $Ca(OH)_2$ particulate. Alternatively, surface sealing can be accomplished using commercially available epoxy preparation, such as Chemcoat epoxies. Optionally, these epoxy surface sealants can be stripped off.

EXAMPLE 14

"Control" of Drying

Certain chemicals will dissolve in TEOS and in ethyl silicates. The presence of these chemicals affects the physical processes which occur in association with the hydrolysis/condensation reactions. In particular, those reactions produce water and alcohol. Evaporation of these can produce forces that may cause formation of microcracks. Appropriate chemical additives reduce or eliminate microcracking. These include, but are not limited to co-solvents with alcohols and water, such as formamide or ethanoxyethanol. These chemicals would be admixed with TEOS or ethyl polysilicates in proportions typically not exceeding a few percent by weight of TEOS or ethyl polysilicates to minimize the tendency for microcrack formation.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of bonding new concrete to existing setting or hardened concrete, the method comprising introducing an Si-containing alkoxide to the existing concrete such that the Si-containing alkoxide at least partially infiltrates the existing concrete and casting the new concrete over the Si-containing alkoxide and existing concrete, said Si-containing alkoxide selected from the group consisting of tetraethyloxysilane, tetramethyloxysilane and an ethyl polysilicate, wherein the Si-containing alkoxide reacts with a source of calcium to form calcium silicate hydrate that bonds the new concrete to the existing concrete.

2. The method of claim 1, wherein $SiO_2$ content of the Si-containing alkoxide ranges from about 1 to 45 weight percent.

3. The method of claim 1, wherein the Si-containing alkoxide participates in a reaction to produce a reactive form of silica selected from the group consisting of anhydrous silica, silicate oligomers, silica hydroxides, and combinations thereof.

4. The method of claim 1, wherein the Si-containing alkoxide undergoes hydrolysis and condensation reactions.

5. The method of claim 4, further comprising introducing a co-solvent to the existing concrete such that the co-solvent at least partially infiltrates the existing concrete to control rates of hydrolysis and condensation.

6. The method of claim 4, further comprising adjusting reaction temperature to control rates of hydrolysis and condensation.

7. The method of claim 4, further comprising introducing colloidal silica to the existing concrete such that the colloidal silica at least partially infiltrates the existing concrete to increase viscosity of the Si-containing alkoxide.

8. The method of claim 4, further comprising introducing an acid to the existing concrete such that the acid at least partially infiltrates the existing concrete to control rates of hydrolysis and condensation.

9. The method of claim 4, further comprising introducing a base to the existing concrete such that the base at least partially infiltrates the existing concrete to control rates of hydrolysis and condensation.

10. The method of claim 9, wherein the base is an alkali silicate.

11. The method of claim 1, wherein the Si-containing alkoxide is diluted with alcohol.

12. The method of claim 1, further comprising introducing a compound to the existing concrete such that the compound at least partially infiltrates the existing concrete, the compound being selected from the group consisting of lithium polysilicate and a lithium alkoxide.

* * * * *

UNITED STATES PATENT AND TRADEMARK OFFICE
CERTIFICATE OF CORRECTION

| | | |
|---|---|---|
| PATENT NO. | : 7,608,143 B2 | Page 1 of 1 |
| APPLICATION NO. | : 11/157559 | |
| DATED | : June 21, 2005 | |
| INVENTOR(S) | : Brown | |

It is certified that error appears in the above-identified patent and that said Letters Patent is hereby corrected as shown below:

Column 6, line 54, "Chemistiy" should read --Chemistry--.
Column 7, line 36, "$(C_2H_5O)_3SiOH + H_2O(C_2H_5O)_2Si(OH)_2 + C_2H_5OH$" should read
--$(C_2H_5O)_3SiOH + H_2O \rightarrow (C_2H_5O)_2Si(OH)_2 + C_2H_5OH$--.
Column 7, line 38, "$(C_2H_5O)_2Si(OH)_2 + H_2O\ C_2H_5OSi(OH)_3 + C_2H_5OH$" should read
--$(C_2H_5O)_2Si(OH)_2 + H_2O \rightarrow C_2H_5OSi(OH)_3 + C_2H_5OH$--.
Column 16, line 60, "Si—O—Si bonds, some Si—$OC_2H_5$ bonds," should read
--Si-O-Si bonds, some Si-$OC_2H_5$ bonds,--.
Column 16, line 61, "Si—OH bonds." should read --Si-OH bonds.--.
Column 17, line 20, "Si—OH and $C_2HsOH$" should read --Si-OH and $C_2H_5OH$--.
Column 17, line 24, "Si—O—Si" should read --Si-O-Si--.
Column 17, line 41, "($3CaO.SiO_2$) and dicalcium silicate ($2CaO.SiO_2$)," should read
--($3CaO·SiO_2$) and dicalcium silicate ($2CaO·SiO_2$),--.
Column 17, line 45, "$3CaO.SiO_2 + 5.3H_2O \rightarrow 1.7CaO.SiO_2.4H_2O + 1.3Ca(OH)_2$" should read
--$3CaO·SiO_2 + 5.3H_2O \rightarrow 1.7CaO·SiO_2·4H_2O + 1.3Ca(OH)_2$--.
Column 17, line 47, "$2CaO.SiO_2 + 4.3H_2O \rightarrow 1.7CaO.SiO_2.4H_2O + 0.3Ca(OH)_2$" should read
--$2CaO·SiO_2 + 4.3H_2O \rightarrow 1.7CaO·SiO_2·4H_2O + 0.3Ca(OH)_2$--.
Column 17, line 62, "$1.7Ca(OH)_2 + SiO_2 + 4H_2O \rightarrow 1.7CaO.SiO_2.4H_2O$" should read
--$1.7Ca(OH)_2 + SiO_2 + 4H_2O \rightarrow 1.7CaO·SiO_2·4H_2O$--.
Column 19, line 15, "—Si—OH + HO—Si— functionalities" should read
-- –Si-OH + HO-Si- functionalities--.
Column 19, line 16, "—Si—O—Si—+ $H_2O$" should read -- –Si-O-Si- + $H_2O$--.

Signed and Sealed this
Third Day of April, 2012

David J. Kappos
*Director of the United States Patent and Trademark Office*